Feb. 4, 1958  G. K. C. HARDESTY  2,821,800
DUO-PANEL EDGE ILLUMINATION SYSTEM
Filed June 28, 1957  2 Sheets-Sheet 1
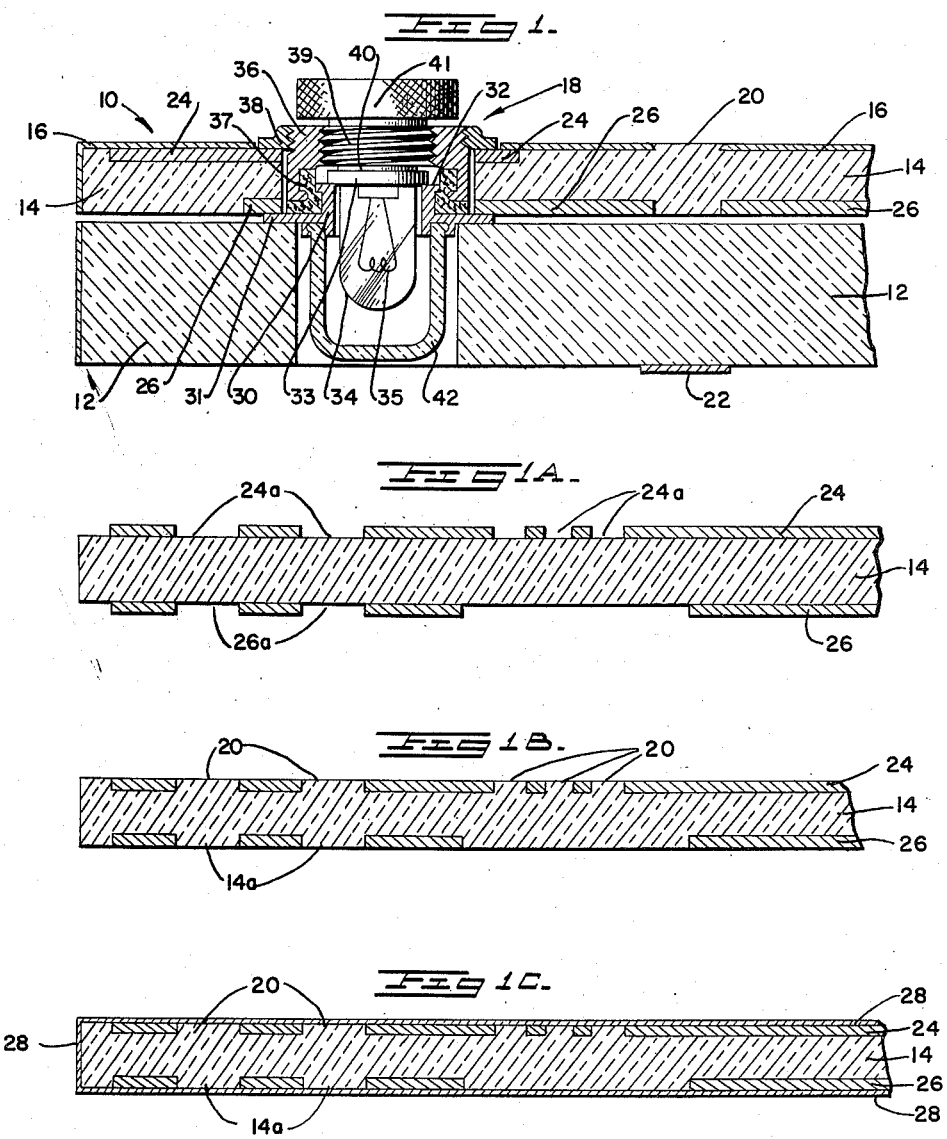
INVENTOR
GEORGE K.C. HARDESTY
BY
ATTORNEYS

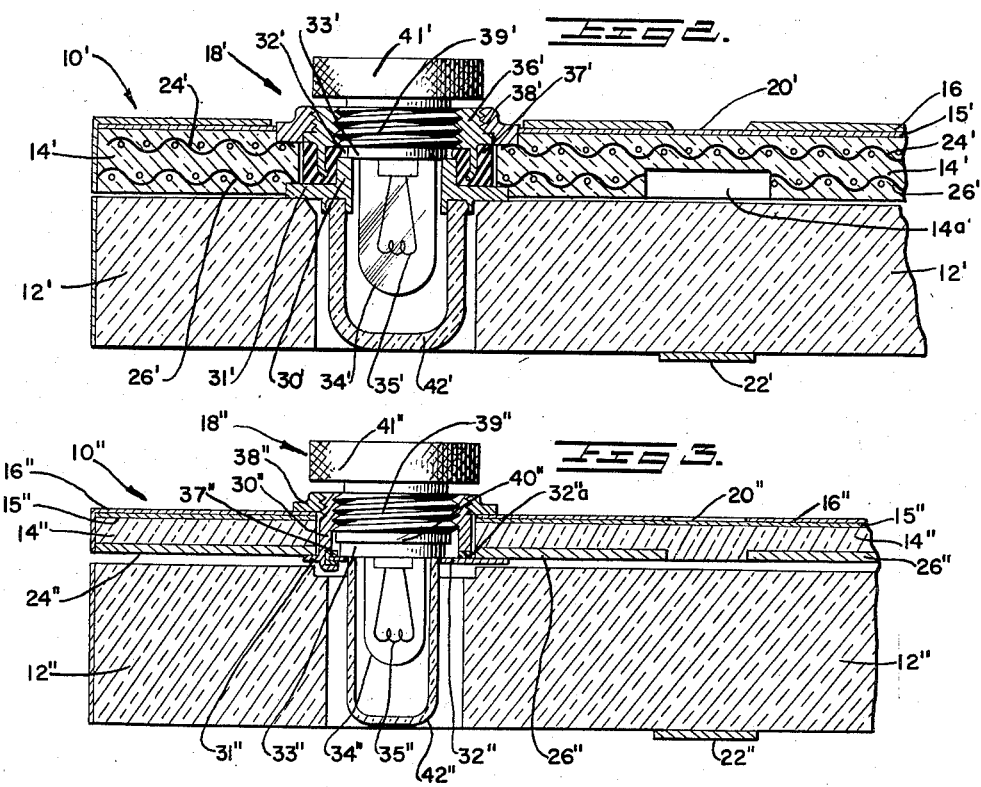
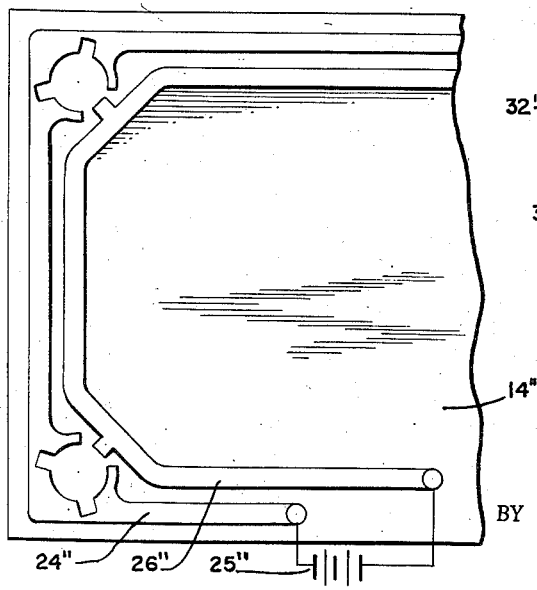
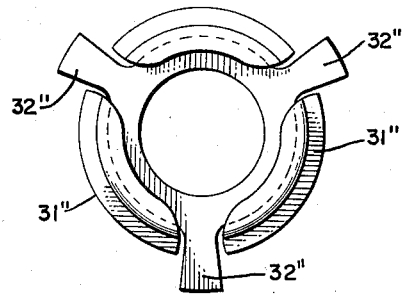

United States Patent Office 2,821,800
Patented Feb. 4, 1958

2,821,800

DUO-PANEL EDGE ILLUMINATION SYSTEM

George K. C. Hardesty, Mayo, Md.

Application June 28, 1957, Serial No. 668,838

11 Claims. (Cl. 40—130)

(Granted under Title 35, U. S. Code (1952), sec. 266)

The invention described herein may be manufactured and used by or for the Government of the United States of America for governmental purposes without the payment of any royalties thereon or therefor.

This application is a continuation-in-part of applicant's copending application Serial No. 369,976, filed July 23, 1953, for Duo-Panel Edge Illumination System.

This invention relates to the illumination of dials, panels, pointers and the like and particularly to the transmission of electric current from a source exteriorly of a panel to a miniature electric lamp, or lamps, within the panel.

More particularly this invention relates to the transmission of electric current to a miniature lamp, or lamps, located within the indicia panel of a duo-panel system.

In applicant's copending application, Serial No. 369,976, filed July 23, 1953, for Duo-Panel Edge Illumination System, referred to above, there is described an invention which has for its object the provision of an improved panel edge illumination system that is particularly suitable in locations in which the preservation of a high degree of dark adaptation of personnel is required. In that application there is described a system that operates on the principle of transmission of light through a transparent plastic sheet by total internal specular reflection to an indicia-bearing sheet which is in poor optical contact with the surfaces of the first sheet. This provides an extremely efficient system since little or no light is lost. While the duo-panel system disclosed in applicant's copending application is extremely efficient, the lamps are located within the inner or light-transmitting panel, which, with some installations renders the lamps inaccessible. Also, with some installations, the problem of transmitting electric current to the lamps may be involved.

It is, therefore, a general object of this invention to provide an improved panel illuminating system.

A further object of this invention is the provision of an illuminating panel that is relatively free of complications.

A still further object of this invention is to provide an illuminating panel wherein the electric lamps are readily accessible for inspection and replacement.

More specific objects of the present invention are to provide a duo-panel illuminating system wherein the electric lamps are carried by the outside or indicia panel and wherein such indicia panel is utilized for transmitting electric current to the lamps.

Briefly, in accordance with the present invention there is provided an illuminating panel comprising primarily a light-transmitting panel and an indicia-bearing panel. The indicia panel is optically separated from the light transmitting panel by suitable means as described hereinafter. One or more miniature lamp fixtures, as desired, are mounted on the indicia panel, with the miniature lamps projecting therefrom into openings in the light-transmitting panel, for transmission of light-rays into such panel. From the light-transmitting panel, the light rays are selectively diffusely reflected into the indicia panel. The indicia panel is variously formed with printed circuits or other conductors for carrying electric current to the lamps.

In one embodiment of the invention, the electric circuits are pressed flush into the top and bottom surfaces of the indicia panel; in a second embodiment the electric circuits are formed by two non-connected wire mesh laminations embedded in the top and bottom surfaces of the indicia panel; and in a third embodiment the electric circuits are pressed flush into only the bottom surface of the indicia panel.

The invention, together with the above and other objects and advantages, is set forth in more technical detail in the following description and accompanying drawings in which like reference characters designate like parts throughout the several views and wherein:

Fig. 1 is a sectional view through a portion of an illuminated panel illustrating one embodiment of the invention;

Figs. 1A, 1B, and 1C are sections through an indicia panel similar to that shown in Fig. 1 and illustrating three steps in the fabrication of such panel;

Fig. 2 is a sectional view through a portion of an illuminated panel illustrating a second embodiment of the invention;

Fig. 3 is a sectional view through a portion of an illuminated panel illustrating a third embodiment of the invention;

Fig. 3A is a bottom plan view of a portion of a lamp socket shown in Fig. 3; and Fig. 3B is typical socket and conductor layout for the type of indicia panel shown in Fig. 3.

For clarity of illustration, the thickness of the light-transmitting panel, the indicia panel, the conductors, the laminations and the various accessories is exaggerated in the drawings.

In Fig. 1 of the drawings, for purpose of illustration, the invention is shown applied to a fragment of an edge-illuminated panel particularly adapted for use aboard ships, aircraft or the like. The structure designated generally by reference numeral 10, includes a panel or light-transmitting member 12 made of a highly transparent plastic. The light-transmitting panel comprises a flat highly transparent sheet or plate of suitable size, having its front and back surfaces in parallel relation to each other and preferably polished to provide smooth optical surfaces for total internal specular reflection of light therebetween. The light-transmitting member is preferably fabricated from an arcylic resin or methyl methacrylate plastic material of the thermoplastic type such as, for example, commercial "Plexiglas" or "Lucite."

Superimposed on the light-transmitting panel is an indicia-bearing panel or lamination 14, made of a translucent light-diffusing material, preferably a white plastic. An opaque lamination or coating 16, preferably black, is superimposed on the indicia panel. Light-transmitting panel 12, indicia-forming panel 14 and opaque lamination 16 are provided with aligned openings therein for the reception of a miniature light fixture 18, which fixture is connected to a suitable source of electric current, as described hereinafter.

Indicia panel 14 is optically separated from light-transmitting panel 12 by an air space, which air space is exaggerated in Fig. 1. As with applicant's copending application Serial No. 369,976, referred to above, the indicia panel may be optically separated from the light-transmitting panel in a number of ways, such as, an air space, point or line contacts between the panels, or by a separating member. For purposes of illustration, the panels 12 and 14 are shown as separated by an air space.

Indicia 20, only one of which is shown in Fig. 1, are formed on the top or obverse surface of the indicia panel by omitting or removing areas of the opaque coating to thereby expose to view desired areas of the translucent panel 14. A light diffusing patch 22 is placed in optical contact with the bottom surface of light-transmitting panel 12 directly opposite each of the indicia formed on the obverse surface of the indicia panel.

In accordance with this invention the light fixture, or fixtures as desired, is carried by the indicia panel and the indicia panel incorporates electric circuits for transmitting electric current to the fixtures.

In accordance with the Fig. 1 embodiment of the invention, electric current is transmitted to the light fixture by a pair of conductors 24 and 26 embedded in the top and bottom surfaces, respectively, of panel 14. The conductors are formed of suitable metal and are connected at one end to a suitable source of electrical energy (not shown) and at opposite ends to the light fixture 18. The conductors may be formed as skeleton conductors or, as disclosed in applicant's copending application Serial No. 600,357, filed July 26, 1956, the conductors may cover the top and bottom surfaces of the indicia panel with openings formed therein for admission and emergence of light thereto and therefrom.

Figs. 1A–1C illustrate various steps in the fabrication of an indicia panel with metal conductors on the top and bottom surfaces, with the top conductor having openings therein to form indicia and with openings in the bottom conductor for passage of light into the panel. Fig. 1A shows the light diffusing panel 14 formed of white translucent plastic and sandwiched between a top metal conductor 24 having indicia openings 24a therein and a bottom metal conductor 26 having light-admitting openings 26a therein directly opposite the top openings. The exposed metal surface of the top conductor may be chemically blackened for contrast with the exposed surface of the white translucent panel 14. The assembly is then placed in a press wherein heat and pressure are applied with the result that the top and bottom metal laminations are pressed into the plastic panel, resulting in flush indicia 20 and the top or obverse surface and with flush areas 14a of exposed panel on the bottom surface for passage of light rays to the indicia. Then the assembly is dipped, sprayed or otherwise coated on all surfaces with a transparent, insulating and waterproof coating 28, as shown in Fig. 1C. Suitable openings, not shown, for light fixtures or the like, may be formed before or after the panel is assembled.

Returning now to Fig. 1, the light fixture 18, which is carried by the indicia panel 14, comprises an annular metal member 30 formed with a peripheral flange 31 that fits under and in electrical contact with the lower conductor 26 and with a top surface 32 adapted to receive in electrical contact a metal flange portion 33 of a miniature electric lamp 34. Flange 33 forms one conductor for a lamp filament 35. A second annular metal member 36 surrounds member 30 and is insulated therefrom by an insulating ring 37. Member 36 is threaded on its outer surface for reception of a threaded metal ferrule 38 and on its inner surface for the reception of a threaded metal barrel 39 of the lamp, which threaded barrel forms a second conductor for the lamp filament 35. The ferrule 38 is screwed into electrical contact with the upper conductor 24. The threaded portion 39 of the lamp is electrically insulated from flange 33 by an insulator 40. A knurled knob 41, for removing the lamp assembly from member 36, forms a top portion of the lamp assembly, and a colored optical filter 42 is clamped to the lower annular member 30.

Thus the lamp fixture of Fig. 1 is formed of two sub-assemblies: One sub-assembly is carried by the indicia panel 14 and includes the annular member 30, optical filter 42, insulating ring 37, annular member 36 and ferrule 38; and a second sub-assembly is carried by the first and includes the lamp 34, filament 35, flange 33, insulator 40, threaded barrel 39 and knob 41. Assuming that conductors 24 and 26 are connected to an external source of electrical energy, current flows from conductor 24 through ferrule 38, annular member 36 and barrel 39 to filament 35, and from the filament, current flows through flange 33, annular member 30, flange 31 and conductor 26 back to the source.

The second embodiment of the invention illustrated in Fig. 2 is generally similar to that of Fig. 1, except that in Fig. 2, the electric conductors are in the form of two or more non-connected wire mesh laminations embedded or bonded integrally within the indicia panel. The wire mesh laminations produce a stress-balanced indicia panel of outstanding structural qualities.

Referring now to Fig. 2, wherein parts like those of Fig. 1 are given like but primed reference numerals, and wherein the duo-panel system indicated generally by reference numeral 10′ includes a transparent light-transmitting panel 12′ and a translucent indicia-bearing panel 14′, optically separated from each other by an air space. The light-transmitting panel comprises a flat, highly transparent sheet or plate of plastic having its front and back surfaces in parallel relation to each other and preferably polished to provide smooth optical surfaces for total internal reflection of light therebetween. The light-transmitting panel is provided with selected, light-diffusing areas 22′ opposite the indicia, to be referred to hereinafter.

Indicia-bearing panel 14′ is formed of translucent, light-diffusing plastic in which are embedded upper and lower wire mesh conductors 24′ and 26′, respectively. The upper surface of panel 14′ includes a white translucent lamination 15′ and black opaque lamination 16′, with selected areas of the opaque lamination omitted or removed to form indicia 20′ on the obverse surface of the panel. A light fixture 18′ is carried by the indicia panel.

Light fixture 18′ comprises an annular metal member 30′ formed with a peripherial flange 31′ that fits under and in electrical contact with conductor 26′ and with a top surface 32′ adapted to receive in electrical contact a metal flange portion 33′ of a miniature lamp 34′. Flange 33′ forms one conductor for the lamp filament 35′. A second annular, metal member 36′ surrounds member 30′ and is insulated therefrom by an insulating ring 37′. Member 36′ is threaded on its outer surface for the reception of a threaded, metal ferrule 38′ and on its inner surface for the reception of a threaded, metal barrel 39′ of the lamp, which barrel forms a second conductor for the lamp filament 35′. The ferrule 38′ is screw threaded into electrical contact with the upper conductor 24′. The threaded portion 39′ of the lamp is electrically insulated from flange 33′ by an insulator, not shown. A knurled knob 41′ forms a grip for removing the lamp assembly from member 36′, and a colored optical filter 42′ is clamped to the lower annular member 30′.

The lamp fixture of Fig. 2, as in Fig. 1, is formed of two sub-assemblies, with one sub-assembly clamped to the indicia panel and the other sub-assembly, including the lamp bulb, removably carried by the first assembly. Assuming that conductors 24′ and 26′ are connected to an external source of electrical energy, current flows from conductor 24′ through ferrule 38′, annular member 36′ and barrel 39′ to filament 35′, and from the filament, current flows through flange 33′, annular member 30′, flange 31′ and conductor 26′ back to the source. Optionally, local areas, such as 14a′, Fig. 2, below the indicia 20′, may be removed from the wire mesh to increase light transmission to the indicia.

The third embodiment of the invention, illustrated in Figs. 3, 3A and 3B, differ from those of Fig. 1 and Fig. 2, in that both of the electrical conductors are mounted on or embedded in the bottom surface of the indicia panel and the light fixture is modified accordingly, otherwise the duo-panel system of Figs. 3, 3A and 3B is generally the same as those of Figs. 1 and 2.

Referring now to Fig. 3, the duo-panel system, indicated generally by reference character 10″, includes a transparent, light-transmitting panel 12″, and a translucent, light-diffusing panel 14″, optically separated from each other by an air space. The light-transmitting panel includes selected, light diffusing areas 22" and is generally similar to the light-transmitting panels of Figs. 1 and 2.

Indicia-bearing panel 14" is formed of translucent, light-diffusing plastic in the lower surface of which are embedded conductors 24" and 26". The upper surface of panel 14" includes a white translucent lamination 15" and a black opaque lamination 16", with selected areas of the opaque lamination omitted or removed to form indicia 20" on the obverse surface of the indicia panel. A light fixture 18" is carried by the indicia panel.

Light fixture 18" includes an annular, metal member 30", threaded on the exterior and interior surfaces thereof and formed on the lower end with two sets of flanges 31" and 32", insulated from each other by insulating gromets 37". Flanges 31" may be formed as integral parts of member 30", or they may be separate members placed in electrical contact with member 30". Flanges 32" are insulated from member 30" by an insulator 32a". As shown in Fig. 3 the outer portion of one of the flanges 31" is located below and in electrical contact with conductor 24", while the inner portion of such flange contacts but is insulated from a metal flange 33" of a miniature lamp 34". Also, as shown in Fig. 3, the outer portion of one of the flanges 32" is located below and in electrical contact with conductor 26", while an inner portion of flange 32" is in electrical contact with flange portion 33" of the lamp. A metal ferrule 38" is screw threaded onto the upper end of member 30" and clamps this first sub-assembly onto the indicia panel. A second sub-assembly, including an optical filter 42", the lamp 34", lamp filament 35", flange 33", insulator 40", threaded barrel 39" and knurled knob 41", is screw-threaded as a unit into the interior of member 30".

Assuming that conductors 24" and 26" are connected to a source of electric current, such as a battery 25", Fig. 3B, current flows through conductors 24", flange 31", member 30" and barrel 39" to one side of lamp filament 35, and from the opposite side of the filament, current flows through flange 33", flange 32" and conductor 26" back to the battery.

Thus it is seen, in each of the illustrated embodiments of the invention, the lamp, or lamps, for illuminating the panel is carried by the indicia panel in a manner as to be readily accessible from the obverse side of the panel and the conductors for transmitting current a the lamps or other fixtures are carried by the indicia panel; all in a manner as not to interfere with the heretofore excellent efficiency of the duo-panel system.

Although the base material of the indicia panels, 14, 14' and 14", has been described throughout this specification as of a translucent plastic formulation, such panels may be formed of any one of a number of light-pervious materials and may range from essentially transparent to translucent in light transmitting characteristics. Further, the indicia panel may include a dye, or dye stuff or a colorant to give this panel a desired light filtering characteristic and render unnecessary the use of a color filter in the lamp fixture assembly. The class of materials including polyester plastic resin, or silicone resin, or bonded fibre glass laminates are particularly applicable since they may be formulated to have a wide range of light transmitting properties. An indicia panel employing such a resin-glass base stock will perform efficiently in a duo-panel system and at the same time possess unique structural strength and resistance to damage in severe military and civilian applications.

It should be understood, of course, that the foregoing disclosure relates to only preferred embodiments of the invention and that numerous modifications or alterations may be made therein without departing from the spirit and the scope of the invention as set forth in the appended claims.

What is claimed is:

1. A duo-panel illumination system comprising, a transparent panel having upper and lower parallel surfaces arranged for specular reflection of light rays therebetween and diffuse reflecting means selectively positioned on the lower surface portion thereof, a translucent panel adjacent and parallel to said transparent panel but optically separated therefrom, said translucent panel having indicia means on the upper surface thereof opposite the diffuse reflecting means on the transparent panel, means for introducing light energy into said transparent panel, whereby the light energy is internally specularly reflected in said transparent panel and diffusely reflected in an upward direction into said indicia means for illumination of said indicia means, and said light introducing means including a light fixture carried by the translucent panel and having a light bulb thereof extending into the transparent panel.

2. A duo-panel illumination system as set forth in claim 1 wherein the translucent panel includes a pair of electric conductors for transmitting current to the light fixture.

3. A duo-panel illumination system as set forth in claim 2 wherein the electric conductors are embedded in the upper and lower surfaces of the translucent panel.

4. A duo-panel illumination system as set forth in claim 2 wherein the electric conductors includes a pair of wire mesh conductors embedded within the translucent panel.

5. A duo-panel illumination system as set forth in claim 2 wherein the electric conductors are embedded in the lower surface of the translucent panel.

6. A duo-panel illumination system comprising, a first transparent panel having substantially parallel upper and lower reflecting surfaces, said surfaces being operative to specularly reflect light rays in said panel, means for introducing light rays into said first panel for transmission therethrough, a second translucent panel substantially parallel to said surfaces positioned adjacent to said first panel but optically separated therefrom by an air space, said second panel having indicia means formed on an obverse surface thereof, light diffusing means associated with said first panel for directing a portion of said light rays to said indicia means for illuminating the indicia means, said light introducing means including a light assembly removably carried by the translucent panel and having a light bulb thereof extending into the transparent panel, and said light assembly being removable from the observe surface of the translucent panel.

7. In a duo-panel illumination system, means for illuminating a dial or the like, said means including a light transmitting panel of transparent material having a light admitting edge portion and parallel upper and lower surfaces, a light source positioned adjacent said light admitting edge portion whereby light rays entering said light transmitting panel are specularly reflected, intenally, between the upper and lower surface portions, a translucent light diffusing panel having an obverse surface with indicia means formed thereon and a lower surface portion, the light diffusing panel comprising a material with characteristics for diffusely transmitting light rays entering therein, said upper surface of said light transmitting panel and the lower surface of said light diffusing panel being positioned adjacent and substantially parallel to each other but optically separated from each other by an air space, diffuse reflecting areas of predetermined sizes and shapes positioned on the lower surface of said light transmitting panel opposite said indicia means for diffusely reflecting portions of the light rays specularly reflected in the light transmitting panel in the direction of said indicia means, whereby light energy is transmitted to the light diffusing panel and diffusely reflected therein for illumination of said indicia means, and said light source including a light assembly removably carried by the light diffusing panel and having a light bulb positioned adjacent the light admitting edge of the light transmitting panel, and said light assembly being removable from the obverse surface of the light diffusing panel.

8. A duo-panel illumination system as set forth in claim 7 wherein the light diffusing panel includes a pair of electric conductors embedded therein for transmitting current to the light assembly.

9. A duo-panel illumination system comprising a transparent light-transmitting panel having parallel upper and lower surfaces arranged for specular reflection of light therebetween and diffuse reflecting means positioned on the lower surface of such panel, a light-pervious panel positioned adjacent and parallel to the transparent panel but optically separated therefrom, indicia means formed on an outer surface of the light-pervious panel in line with the diffuse reflecting means on the transparent panel, means for introducing light energy into the transparent panel whereby such light energy is internally specularly reflected in the transparent panel and diffusely reflected therefrom by the diffuse reflecting means into the light-pervious panel for illuminating the indicia formed thereon, and said light introducing means including a lamp assembly carried by the light-pervious panel and having a bulb thereof extending into the transparent panel.

10. A duo-panel illumination system as set forth in claim 9 wherein the light-pervious panel includes a pair of electric conductors for transmitting current to the light assembly carried thereby.

11. A duo-panel system as set forth in claim 9 wherein the light-pervious panel is formed of a material having color filter characteristics for filtering light rays passing from the transparent panel into such light-pervious panel.

No references cited.